United States Patent [19]

Hoogenboom

[11] Patent Number: 5,717,461
[45] Date of Patent: Feb. 10, 1998

[54] DRAM MAPPING FOR A DIGITAL VIDEO DECOMPRESSION PROCESSOR

[75] Inventor: Chris Hoogenboom, La Jolla, Calif.

[73] Assignee: General Instrument Corporation of Delaware, Chicago, Ill.

[21] Appl. No.: 678,145

[22] Filed: Jul. 11, 1996

Related U.S. Application Data

[63] Continuation of Ser. No. 288,402, Aug. 10, 1994, abandoned.

[51] Int. Cl.$^6$ .................................... H04N 7/18
[52] U.S. Cl. .................. 348/394; 348/394; 348/411; 348/416; 348/715; 348/716; 348/719; 395/164; 395/165
[58] Field of Search .................. 382/56; 348/384, 348/394, 412, 415, 411, 419, 715, 716, 717, 718, 719, 721; 364/964; 395/164, 165, 115

[56] References Cited

U.S. PATENT DOCUMENTS

| | | | |
|---|---|---|---|
| 5,220,425 | 6/1993 | Enari et al. | 348/715 |
| 5,293,593 | 3/1994 | Hodge et al. | 364/964 |
| 5,379,070 | 1/1995 | Retter et al. | 348/716 |
| 5,384,581 | 1/1995 | Ikeda | 348/716 |
| 5,386,233 | 1/1995 | Keith | 348/716 |
| 5,398,072 | 3/1995 | Auld | 348/715 |
| 5,406,311 | 4/1995 | Michelson | 348/716 |

OTHER PUBLICATIONS

"Advanced Information," *RDRAM Reference Manual*, pp. 3–7 & 12, Copyright 1993.
"MPEG2/CCIR 601 Video Decoder", *SGS–Thomson Microelectronics*, pp. 1–84. (Jul. 1994).

*Primary Examiner*—Amelia Au
*Assistant Examiner*—Anand Rao
*Attorney, Agent, or Firm*—Barry R. Lipsitz

[57] ABSTRACT

A random access memory of a digital video decompression processor is mapped to enable the reconstruction of successive video frames of pixel data represented by a compressed video bitstream. A FIFO buffer is provided in the RAM for the compressed video bitstream. A first luminance anchor frame buffer and a first chrominance anchor frame buffer are provided for storing a full frame of luminance data and a full frame of chrominance data for a first anchor frame used to predict B-frames. A second luminance anchor frame buffer and second chrominance anchor frame buffer are provided for storing a full frame of luminance data and a full frame of chrominance data for a second anchor frame used to predict the B-frames. A first B-frame luminance buffer is provided in the RAM and sized to store less than 100% of the amount of luminance data in a first B-frame field. A second B-frame luminance buffer is provided in the RAM and sized to store at least 100% of the amount of luminance data in a second B-frame field. A B-frame chrominance buffer is provided in the RAM to store at least 100% of the amount of chrominance data in a B-frame. The anchor frames and B-frames are read from the RAM to enable the reconstruction of successive video frames. The memory mapping is particularly well suited for the decompression of PAL formatted video in an MPEG-2 decoder.

20 Claims, 4 Drawing Sheets

5,717,461

DRAM MAPPING FOR A DIGITAL VIDEO DECOMPRESSION PROCESSOR

This application is a continuation of commonly assigned, U.S. patent application Ser. No. 08/288,402 now abandoned filed Aug. 10, 1994.

BACKGROUND OF THE INVENTION

The present invention relates to a video decompression processor, and more particularly to an efficient memory mapping scheme useful in decompressing phase alternating line (PAL) digital video signals having B-frames.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

A substantial amount of digital data must be transmitted in any digital television system. In a digital television system, a subscriber receives the digital data stream via a receiver/descrambler that provides video, audio and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels." A large amount of data is required to define each video frame of a television signal. For example, 9.7 megabits of data is required to provide one video frame at PAL resolution. This assumes a 704 pixel by 576 line display is used with eight bits of intensity value for each of the primary colors red, green and blue. In order to manage this amount of information, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding is usually used to transmit only the difference between an actual frame and a prediction of the actual frame. The prediction is based on information derived from a previous frame of the same video sequence.

Examples of video compression systems using motion compensation can be found in Krause, et al. U.S. Pat. Nos. 5,057,916; 5,068,724; 5,091,782; 5,093,720; and 5,235,419. Generally, such motion compensation systems take advantage of a block-matching motion estimation algorithm. In this case, a motion vector is determined for each block in a current frame of an image by identifying a block in a previous frame which most closely resembles the particular current block. The entire current frame can then be reconstructed at a decoder by sending the difference between the corresponding block pairs, together with the motion vectors that are required to identify the corresponding pairs. Often, the amount of transmitted data is further reduced by compressing both the displaced block differences and the motion vector signals. Block matching motion estimation algorithms are particularly effective when combined with block-based spatial compression techniques such as the discrete cosine transform (DCT).

In order to implement video compression in practical systems, a video decompression processor is required for each digital television receiver. The development of very large scale integration (VLSI) integrated circuit chips is currently underway to implement such video decompression processors. In consumer products such as television sets, it is imperative that the cost of the system components be kept as low as possible. One of the significant costs associated with a video decompression processor is the memory required to (i) buffer the compressed data prior to decompression, (ii) store the previous frame data necessary to predict a current frame using motion estimation techniques, and (iii) buffer the decompressed data prior to its output to a video appliance such as a television set, video tape recorder, or the like. The minimization of the memory requirements is particularly important when the transmitted video has been encoded using bidirectionally predicted frames (B-frames).

Each of a succession of digital video frames that form a video program can be categorized as an intra frame (I-frame), predicted frame (P-frame), or B-frame. The prediction is based upon the temporal correlation between successive frames. Portions of frames do not differ from one another over short periods of time. The encoding and decoding methods differ for each type of picture. The simplest methods are those used for I-frames, followed by those for P-frames and then B-frames.

I-frames completely describe a single frame without reference to any other frame. For improved error concealment, motion vectors can be included with an I-frame. An error in an I-frame has the potential for greater impact on the displayed video since both P-frames and B-frames are predicted from an I-frame.

P-frames are predicted based on previous I or P frames. The reference is from an earlier I or P frame to a future P-frame and is therefore called "forward prediction." B-frames are predicted from the closest earlier I or P frame and the closest later I or P frame. The reference to a future picture (i.e., one that has not yet been displayed) is called "backward prediction." There are cases where backward prediction is very useful in increasing the compression rate. For example, in a scene in which a door opens, the current picture may predict what is behind the door based upon a future picture in which the door is already open.

B-frames yield the most compression but also incorporate the most error. To eliminate error propagation, B-frames may never be predicted from other B-frames. P-frames yield less error and less compression. I-frames yield the least compression, but are able to provide random access entry points into a video sequence.

One standard that has been adopted for encoding digital video signals is the Motion Picture Experts Group (MPEG) standard, and more particularly the MPEG-2 standard. This standard does not specify any particular distribution that I-frames, P-frames and B-frames must take within a sequence. Instead, the standard allows different distributions to provide different degrees of compression and random accessibility. One common distribution is to have I-frames about every half second and two B-frames between successive I or P frames. To decode P frames, the previous I-frame must be available. Similarly, to decode B frames, the previous and future P or I frames must be available. Consequently, the video frames are encoded in dependency order, such that all pictures used for prediction are coded before the pictures predicted therefrom. Further details of the MPEG-2 standard (as well as the alternative DigiCipher®II standard) and its implementation in a video decompression processor can be found in document MC68VDP/D, a preliminary data sheet entitled "MPEG-2/ DCII Video Decompression Processor," ©Motorola Microprocessor and Memory Technologies Group, 1994, incorporated herein by reference.

It would be advantageous to provide a memory mapping scheme for use in a video decompression processor that is economical and efficiently utilizes memory capacity. More particularly, such a scheme should enable the decoding of PAL images with B-frames using a minimal amount of dynamic random access memory (DRAM). Ideally, MPEG-2 PAL images of 704 pixels×576 lines with B-frames should be accommodated using just sixteen Mbits (megabits, i.e., $2^{20}$ bits) of DRAM. An MPEG-2 video signal using B-frames in a PAL format and having video frames containing 576 video lines of 352 pixels each should also be able to be accommodated in 8 Mbits of DRAM.

The present invention provides a memory mapping scheme which enables the implementation of a video decompression processor having the aforementioned advantages.

SUMMARY OF THE INVENTION

The present invention provides a digital video decompression processor for a compressed video bitstream representative of successive video frames of pixel data. A memory manager maps a random access memory to provide various buffers. A first-in first-out (FIFO) buffer is provided for the compressed video bitstream. A first luminance anchor frame buffer and a first chrominance anchor frame buffer are provided for storing a full frame of luminance data and a full frame of chrominance data for a first anchor frame used to predict B-frames and/or P-frames. The first anchor frame is subsequently output from the buffer for use in reconstructing the successive video frames. A second luminance anchor frame buffer and a second chrominance anchor frame buffer are provided for storing a full frame of luminance data and a full frame of chrominance data for a second anchor frame used to predict the B-frames and/or P-frames. The second anchor frame is also subsequently output from the buffer for use in reconstructing the successive video frames. A first B-frame luminance buffer, sized to store less than 100% (and preferably about 50% to 66%) of the amount of luminance data in a first B-frame field, is provided for use in reconstructing the successive video frames. A second B-frame luminance buffer, sized to store at least 100% (and preferably about 100% to 120%) of the amount of luminance data in a second B-frame field is provided for use in reconstructing the successive video frames. A B-frame chrominance buffer, sized to store at least 100% (and preferably about 100% to 120%) of the amount of chrominance data in a B-frame, is provided for use in reconstructing the successive video frames.

In a preferred, illustrated embodiment the FIFO buffer comprises substantially all of the storage space left in the random access memory after accounting for the first and second luminance and chrominance anchor frame buffers, the first and second B-frame luminance buffers and the B frame chrominance buffer.

In a more specific embodiment, a digital video decompression processor is provided for decompressing an MPEG-2 video signal using B-frames in a PAL format and having video frames containing 576 video lines of 704 pixels each. The first and second luminance anchor frame buffers each accommodate 576 video lines. The first and second chrominance anchor frame buffers each accommodate 288 video lines. The first B-frame luminance buffer accommodates 184 video lines and the second B-frame luminance buffer and B-frame chrominance buffer each accommodate 320 video lines. In this embodiment, the random access memory can comprise a sixteen megabit memory. The memory manager can further provide a portion of the random access memory, equivalent to about one video line, for storing data (such as pan control data, closed caption data, horizontal and vertical size data, repeat first field and top field first flags, chroma post processing type, sample aspect ratio, field sequence and scan method flags, etc.) required to properly display a decoded video frame.

In another specific embodiment, a digital video decompression processor is provided for decompressing an MPEG-2 video signal using B-frames in a PAL format and having video frames containing 576 video lines of 352 pixels each. Each of the first and second luminance anchor frame buffers accommodates 576 video lines. The first and second chrominance anchor frame buffers each accommodate 288 video lines. The first B-frame luminance buffer accommodates 144 video lines and the second B-frame luminance buffer and B-frame chrominance buffer each accommodate 288 video lines. This specific embodiment can be implemented in an eight megabit RAM, with the memory manager providing a portion of the RAM equivalent to about one video line for storing data required to properly display a decoded video frame.

A digital video decompression processor in accordance with the present invention can also comprise means for decoding the compressed video bitstream to reconstruct the B-frames from predictions based on the anchor frames. The memory manager writes portions of a B-frame being reconstructed into corresponding portions of the B-frame buffers. The memory manager commences reading first field luminance data for the B-frame being reconstructed from the first B-frame luminance buffer, for use in reconstructing a video frame for display, before the B-frame has been entirely reconstructed by the decoding means.

A method is provided for mapping a random access memory of a digital video decompression processor to enable the reconstruction of successive video frames of pixel data represented by a compressed video bitstream. A FIFO buffer is provided in the RAM for the compressed video bitstream. A first luminance anchor frame buffer and a first chrominance anchor frame buffer are provided in the RAM for storing a full frame of luminance data and full frame of chrominance data for a first anchor frame used to predict B-frames and/or P-frames. A second luminance anchor frame buffer and second chrominance anchor frame buffer are provided in the RAM for storing a full frame of luminance and a full frame of chrominance data for a second anchor frame used to predict the B-frames and/or P-frames. A first B-frame luminance buffer is provided in the RAM and sized to store less than 100% (and preferably about 50%–66%) of the amount of luminance data in a first B-frame field. A second B-frame luminance buffer is provided in the RAM and sized to store at least 100% (and preferably about 100%–120%) of the amount of luminance data in a second B-frame field. A B-frame chrominance buffer is provided in the RAM and sized to store at least 100% (and preferably about 100%–120%) of the amount of chrominance data in a B-frame. The anchor frames and B-frames are read from the RAM to enable the reconstruction of the successive video frames.

The step of providing the FIFO buffer in accordance with the present invention can allocate to the FIFO buffer substantially all of the storage space left in the random access memory after accounting for the first and second luminance and chrominance anchor frame buffers, the first and second B-frame luminance buffers and the B-frame chrominance buffer. The method can comprise the further steps of writing first and second field luminance and chrominance portions of a B-frame being reconstructed into corresponding portions of the B-frame buffers. The first field luminance data for the B-frame being reconstructed is read from the first B-frame luminance buffer before the B-frame has been entirely reconstructed. In this manner, storage locations of the first B-frame luminance buffer are available for reuse to provide storage space for remaining portions of the B-frame as the reconstruction of the B-frame continues.

DETAILED DESCRIPTION OF THE INVENTION

Figure 1:
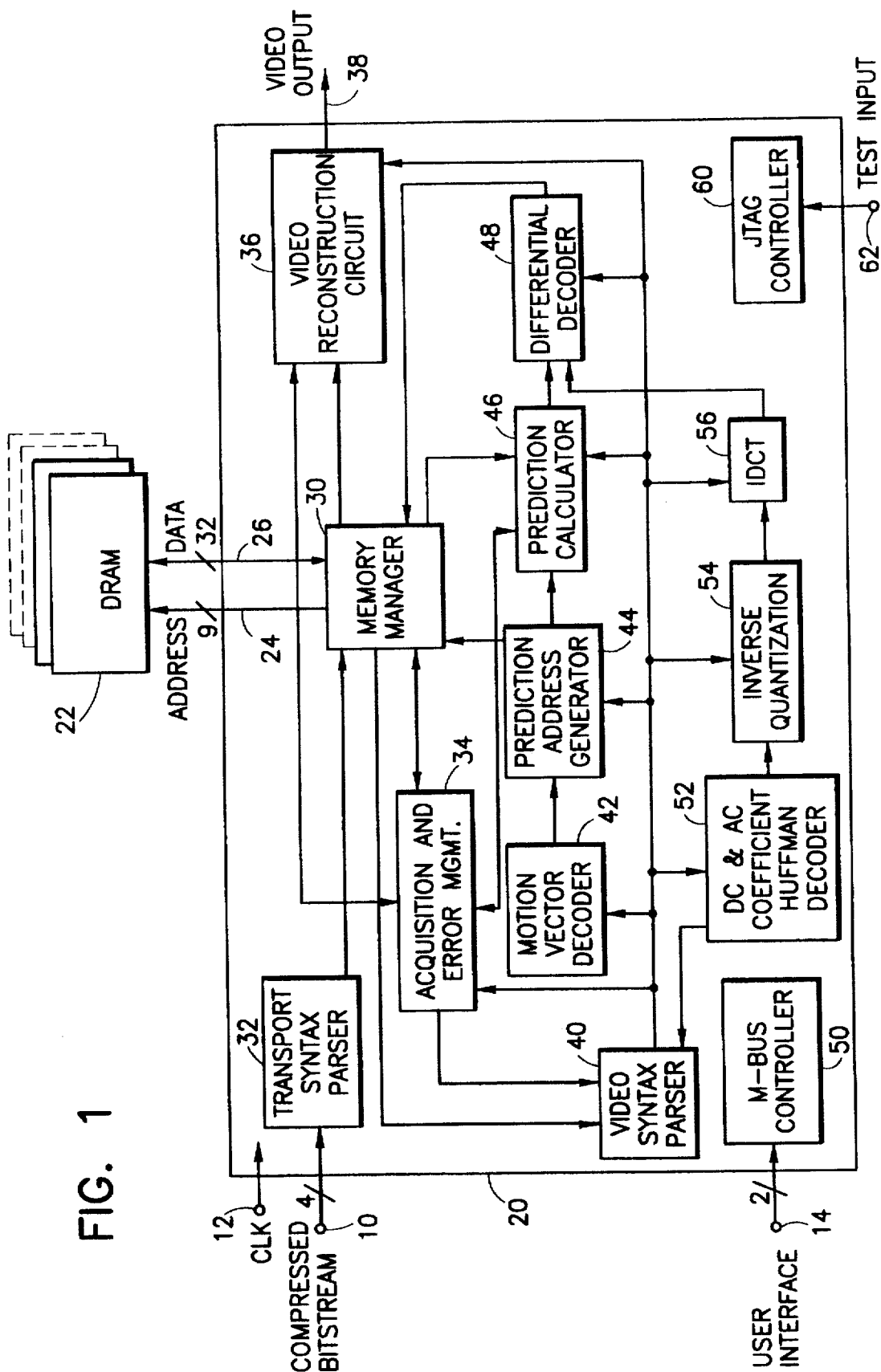
FIG. 1 is a block diagram of a video decompression processor in accordance with the present invention.

FIG. 1 is a block diagram of a video decompression processor incorporating a memory manager that maps external DRAM 22 in accordance with the present invention. The processor, generally designated 20, is a pipelined processor designed to decode both the transport layer (i.e., control and other non-video information) and the video layer of the compressed bitstream input via terminal 10, sometimes referred to as the "transport packet interface" of the video processor.

A user processor interface is provided at terminal 14 for control of the video data processor via an M-bus controller 50 that configures various registers in processor 20. The M-bus is a two-wire, bidirectional serial bus which provides a simple and efficient means of data exchange between devices, and is fully compatible with the I²C bus standard.

An interface to the DRAM is provided via address lines 24 and data lines 26. In the specific embodiment illustrated in FIG. 1, DRAM 22 has a nine bit address port and a thirty-two bit data port.

A video output interface 38 is provided for the decompressed, reconstructed video which may, for example, be output as a standard CCIR (International Radio Consultive Committee) 656, eight bit, twenty-seven MHz multiplexed luminance (Y) and chrominance (Cr, Cb) signal.

A test interface can be provided via terminal 62 to a conventional JTAG (Joint Test Action Group) controller 60. JTAG is a standardized boundary scan methodology used for board-level testing to detect faults in package and board connections, as well as internal circuitry.

The video decompression processor 20 receives a clock via terminal 12. The clock provides timing information for, e.g., enabling a transport syntax parser 32 to recover timing information and video information from transport packets in the compressed bit stream input via terminal 10. An acquisition and error management circuit 34 utilizes a program clock reference (PCR) and decode time stamp (DTS) detected by a video syntax parser 40 to synchronize the start of picture decoding. This circuit sets vertical synchronization and provides global synchronization for all video decode and display functions.

The video layer is buffered in an input buffer (FIFO) configured by a memory manager 30 in the external DRAM 22. The video syntax parser 40 receives the compressed video data output from the DRAM FIFO via memory manager 30, and separates the motion vector information from the coefficients describing the video information. The coefficients are processed by a Huffman decoder 52, inverse quantizer 54, and inverse discrete cosine transform (IDCT) processor 56.

Motion vectors are recovered and used to address previously decoded video frames required for reconstructing a current video frame. In particular, a motion vector decoder 42 decodes the motion vectors received from video syntax parser 40 and passes them to a prediction address generator 44. The prediction address generator generates the necessary addresses to retrieve, via memory manager 30, the necessary anchor frame data to enable prediction calculator 46 to reconstruct a current frame block. Differential decoder 48 combines the prediction signal with the decoded coefficient data to provide decompressed video data. The decompressed data is stored in appropriate buffers of DRAM 22 via memory manager 30.

It should be appreciated that the video decompression process carried out by motion vector decoder 42, prediction address generator 44, prediction calculator 46, differential decoder 48, Huffman decoder 52, inverse quantizer 54 and IDCT 56 are conventional and well understood by those skilled in the art. These components do not provide any part of the present invention, although they do provide the decompressed video that is stored in DRAM 22 in accordance with the present memory mapping scheme.

Memory manager 30 schedules all activity on the external DRAM address and data buses 24, 26 and efficiently maps DRAM 22 in accordance with the present invention. Thus, the memory manager insures that the data transfer requirements of the input FIFO portion of DRAM 22, the video syntax parser 40 and the video reconstruction circuit 36 (as well as prediction calculator 46 and differential decoder 48) are all met. The video reconstruction circuit 36 calculates a current picture and inserts closed caption, a vertical interval test signal (VITS) and test pattern data for output on video output line 38. The output display is synchronized by comparing the PCR to a presentation time stamp (PTS). A determination of when the decoding of a video frame must commence is made by comparing the decode time stamp (DTS) to the program clock reference (PCR).

The memory manager also provides a variable size for the FIFO portion of DRAM 22 depending on the decoding mode, which can be, for example, PAL with or without B-frames. The present invention is concerned with the processing of PAL signals using B-frames. The video buffer control ensures that the FIFO provided by DRAM 22 does not overflow or underflow. Buffer control is a function of system timing parameters including the PCR and DTS.

DRAM 22 is illustrated as an external memory and may be provided by a plurality of DRAM chips, such as two, four Mbit DRAMs for an eight Mbit implementation or four, four Mbit DRAMs for a sixteen Mbit implementation. It should be appreciated that in future implementations, and as memory technology advances, DRAM 22 may be provided as internal memory within the video decompression processor. The DRAM is mapped in accordance with the present invention to provide various decode and output video buffers as well as the circular FIFO for the compressed input video bitstream. The DRAM may also be used to provide a test pattern buffer, a VITS buffer and a closed captioning display reordering buffer as well as to store various picture structure data necessary to properly display the decoded video frames. The DRAM can be reinitialized via memory manager 30 to provide different memory maps as required when variables are modified such as the video frame vertical size, PAL or NTSC video, the presence of test patterns, eight or sixteen Mbit memory configuration, and whether B-frames are present.

The memory manager 30 schedules all of the activity on the external DRAM buses including the data transfer requirements of the input FIFO, the video parser and the video reconstruction circuit. The memory manager also performs the required DRAM refresh in a conventional manner. For example, the same row in each of two or four external DRAMs can be refreshed simultaneously.

Figure 2:
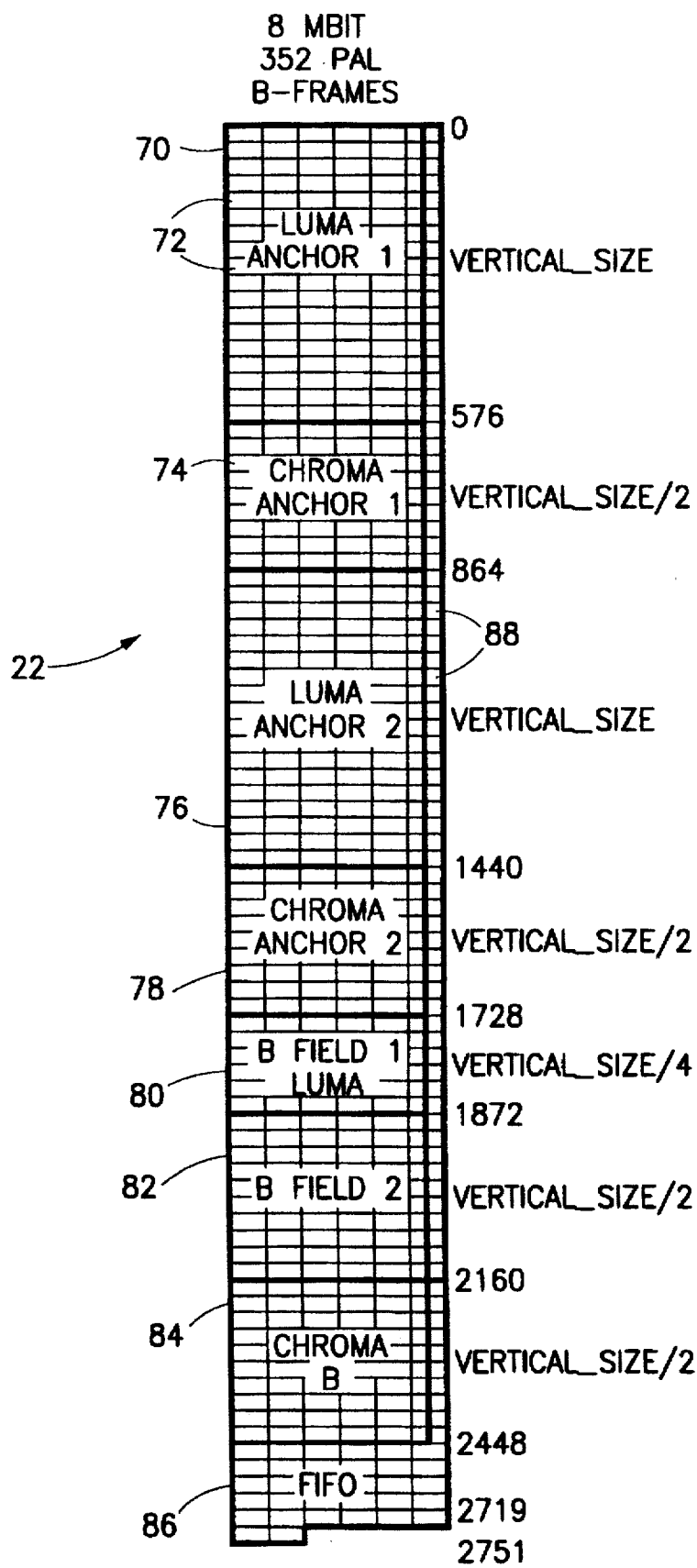
FIG. 2 is a diagrammatic illustration of a memory mapping scheme for a PAL implementation having lines of 352 pixels each and B-frames, using eight megabits of memory.

FIG. 2 illustrates a first memory map for DRAM 22 in accordance with the present invention. The embodiment of FIG. 2 is useful in connection with a PAL video format using B-frames, where each video frame comprises 576 lines of active video, with each line having 352 eight-bit pixels. The memory map corresponds to an eight Mbit DRAM. The DRAM is divided into 512 pages 72, with each page holding 512 thirty-two bit words for a total of 8,388,608 (eight Mbits) of memory.

The DRAM of FIG. 2 is mapped into eight separate buffers. A first buffer 70 is used to store a full frame of luminance at a time, and particularly frames designated as first luminance anchor frames. When decoding B-frames, there are two "anchor" frames which can each be either an I-frame or a P-frame. One of the anchor frames is used for forward prediction and the other is used for backward prediction.

A second luminance anchor frame buffer 76 shown in FIG. 2 is also the size of one frame of luminance. Two chrominance anchors 74, 78 are each the size of one frame of chroma. Thus, the first luma anchor buffer 70 and the second luma anchor buffer 76 each have sufficient storage to hold 576 lines of PAL luminance data, where each line contains 352 pixels. Each video frame has half as much chrominance data as luminance data, and therefore the first and second chrominance anchor buffers 74, 78 respectively are one-half the size of the first and second luminance anchor buffers. The chrominance anchor buffers each hold 288 lines of pixel data, with each line containing 352 pixels. The luminance and chrominance data for the anchors is stored in the associated buffers 70, 74, 76 and 78 after decompression, for use in decoding the B-frames. The anchor frame data is subsequently output from the buffers, when needed for display by the video appliance for which the video data is being decoded.

In addition to the anchor buffers, the memory mapping of the present invention provides a first B-frame luminance buffer 80 and a second B-frame luminance buffer 82, as well as a B-frame chrominance buffer 84. The first B-frame luminance buffer is sized to store less than the full amount of luminance data in a first B-frame field, whereas the second B-frame luminance buffer is sized to store at least 100% of the amount of luminance data in a second B-frame field. The provision of a first B-frame luminance buffer 80 that is smaller than the second B-frame luminance buffer 82 enables an advantageous conservation of memory, allowing only eight Mbit of memory to be used for PAL processing with B-frames when each video line contains 352 pixels, and 16 Mbit of memory to be used for PAL video with B-frames when each video line contains 704 pixels. In the eight Mbit implementation illustrated in FIG. 2, the first B-frame luminance buffer has a vertical size that is only one quarter of a full video frame (i.e., one-half of a field). Thus, buffer 80 only accommodates 144 video lines instead of the full 288 video lines contained in the first field of a B-frame. The second B-frame luminance buffer 82, on the other hand, must accommodate a full field (288 lines) of a B-frame. Similarly, the full 288 lines of chrominance data for a video frame is accommodated by B-frame chrominance buffer 84.

Except for about one video line worth of memory that is used to store frame specific data required to properly display a decoded video frame and for test patterns and the vertical interval test signal (VITS), the remaining storage space in DRAM 22 (after accounting for the anchor buffers and B-field buffers) is allocated to the input FIFO. This FIFO is used to temporarily store the compressed video data from the input bitstream until it is ready to be processed (i.e., decompressed) by the motion compensation/motion estimation circuitry. As illustrated in FIG. 2, the FIFO 86 includes memory page portions 88 which are not entirely filled by the anchor buffers and B-frame buffers. No portion of the DRAM is wasted.

Implementation of the memory map of FIG. 2 in accordance with the present invention is possible due to the fact that display of the first field of each B-frame can commence before that field has been entirely decoded. Thus, it is possible to write into the buffer lines vacated by display of the first half of the first B-frame field, when decoding the second half of that field. The result is most clearly explained with reference to FIG. 4.

Figure 4:
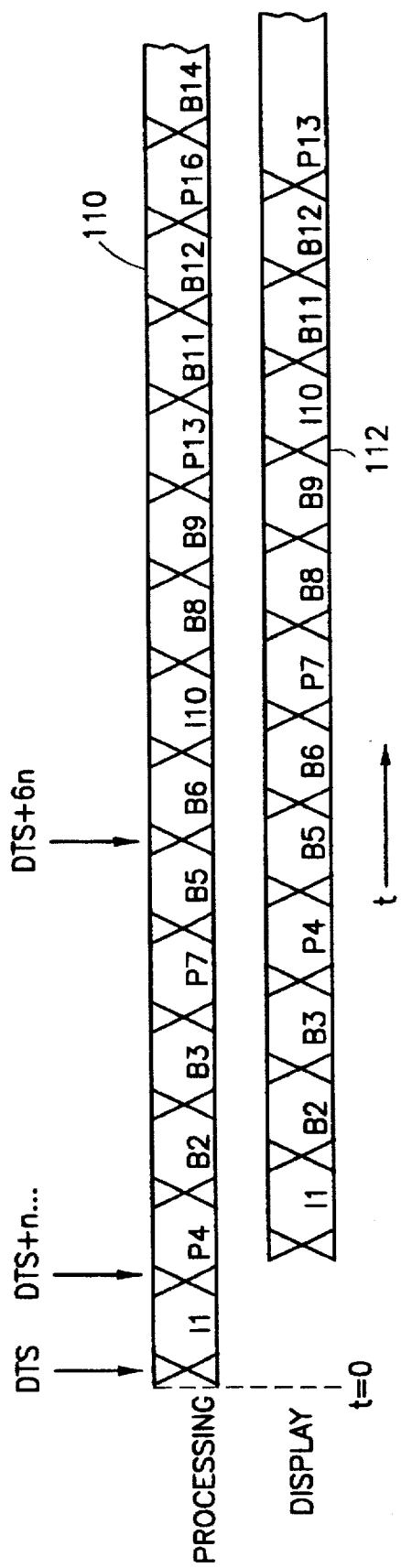
FIG. 4 is a timing diagram illustrating the decoding ("processing") and display of successive video frames.

FIG. 4 is a timing diagram illustrating the decoding ("processing") of successive video frames and the display of those frames. As indicated above, the compressed video bitstream will contain data for I-frames, P-frames and B-frames. The B-frames are predicted from the closest earlier I-frame or P-frame and the closest later I-frame or P-frame. As an example, these frames can be transmitted in the following order:

I1 P4 B2 B3 P7 B5 B6 I10 B8 B9 P13 B11 B12 P16 B14 B15 I19 B17 B18 . . .

and displayed in the order:

I1 B2 B3 P4 B5 B6 P7 B8 B9 I10 B11 B12 P13 B14 B15 P16 B17 B18 I19 . . .

Although the frames are transmitted with each pair of B-frames surrounded by I and/or P anchor frames, they cannot be processed in this order. Instead, the necessary anchor frames must be processed first so that the B-frames bracketed thereby can then be derived. This is illustrated by the "processing" time line 110 of FIG. 4. When a decode time stamp (DTS) for a picture is received, processing of the first I-frame (I1) commences. At time DTS+n, processing of the next anchor frame (in this case P4) commences. The time increment designated by n is the amount of time between successive frames in the particular television format. In the PAL format, there are 25 frames per second, so that n=1/25 second.

Time line 112 illustrates when the video frames that are processed at the times indicated by time line 110 are output to a video appliance, e.g., for display. As illustrated in FIG. 4, frame I1 is ready for display after this frame has been processed and half of the following anchor frame P4 has been processed. After the anchor frames I1 and P4 have been decoded and stored in their respective buffers 70, 74 and 76, 78, it is possible to decode the first B-frame B2. This B-frame must be output for display directly after I-frame I1 is output for display, since the proper ordering of the frames is I1 B2 B3 P4 B5 . . . as indicated above.

As can be seen by comparing time lines 110 and 112 of FIG. 4, the display of each B-frame (e.g., B2) commences after only half of that frame has been decoded. Thus, as soon as the video decompression processor is one-half way through the decoding of a B-frame, the display of that frame is commenced. Further, as soon as the display of the last field of a frame commences, decoding of the next frame can commence. Since field one of each B-frame is displayed at twice the rate it is being decoded, it is only necessary to decode one-half of the field before the display thereof is commenced. It should be appreciated that by providing a suitable rate flow buffer, decoding could commence even earlier.

The buffers illustrated in FIG. 2 have a circular architecture. Since the MPEG-2 standard provides for the decoding of data in a frame order, with display of the data in a field order, the buffers are also used to reorder the video data from frame order to field order. The decoding of half the B-frame in a frame order involves the processing of one-half of field one of the B-Frame and one-half of field two of the B-frame. One-half of the first field is equivalent to one quarter of the whole frame. For a 576 line frame, this represents 144 lines. Thus, by the time one-half of B-frame B2 has been processed, there are 144 lines of field one and 144 lines of field two to be stored in the respective first and second B-frame buffers 80, 82. The 144 lines of field one data will completely fill the field one B-frame buffer 80. However, at this point the system can start displaying B-frame B2 while it continues to process the second half of this B-frame.

The concurrent processing and display of field one enables the field one buffer 80 to be immediately used to store new data for the field as previously stored data for the same field is output for display. Since the MPEG-2 standard dictates that data is decoded in frame order but displayed in field order, field one will be output for display in its entirety before the output of field two commences. Accordingly, it is necessary to hold all of field two in the second B-frame buffer 82 prior to outputting this field for display. Thus, the size of buffer 82 must accommodate a full field of the B-frame, and cannot be reduced to the size of one half of a field as was the case for buffer 80.

It should be appreciated that the only buffer which can be reduced in size in accordance with the present invention is buffer 80. As indicated above, the second B-frame luminance buffer 82 must be sized to store a full B-frame field. Similarly, the B-frame chrominance buffer 84 must store a full frame of chrominance data, since this data is used in connection with the display of both of the B-frame fields. Each of the anchor buffers must be full size, since all of the information for the two anchors bracketing a B-frame must be available in order to complete the processing of that B-frame.

The resultant reduction of the amount of memory required to store one-half of one field of B-frame data is significant. As indicated by the memory map of FIG. 2, a full field (e.g., buffer 82) requires 288 lines×352 pixels×8 bits=811,008 bits of storage. Saving one-half of this represents a savings of over 400 Kbits of DRAM.

Figure 3:
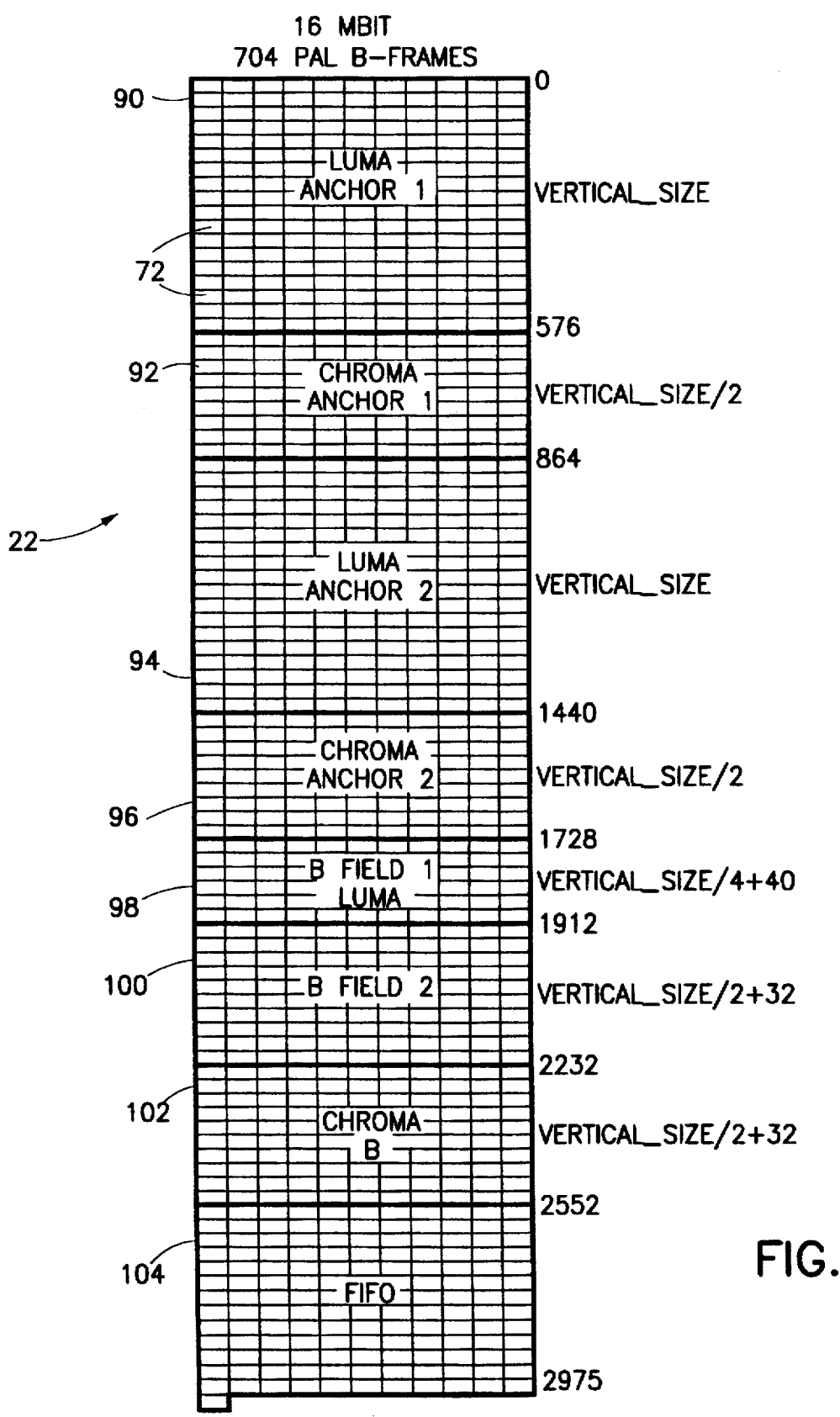
FIG. 3 is a diagrammatic illustration of a memory mapping scheme for a PAL implementation having lines of 704 pixels each with B-frames, using 16 megabits of memory.

FIG. 3 illustrates a memory map in accordance with the present invention for a PAL embodiment where each video frame includes 576 active lines of video, each line containing 704 eight bit pixels. This embodiment requires a 16 Mbit DRAM 22. Each DRAM page 72 comprises 512 thirty-two bit words. As with the eight Mbit embodiment of FIG. 2, each of the first and second luminance anchor buffers 90, 94 holds a full frame (576 lines) of data. Similarly, each of the first and second chrominance anchor buffers 92, 96 holds a full frame (288 lines) of chrominance data.

FIG. 3 is also similar to the embodiment of FIG. 2 in that the first B-frame luminance buffer 98 is sized to store less than the full amount of luminance data in a first B-frame field. The second B-frame luminance buffer is sized to store at least 100% of the amount of luminance data in the second field of the B-frame. The B-frame chroma buffer 102 is the same size as the second B-frame luminance buffer 100. The FIFO buffer 104 comprises substantially all of the storage space left in the DRAM after accounting for the first and second luminance and chrominance anchor frame buffers (90, 94, 92, 96), the first and second B-frame luminance buffers (98, 100) and the B-frame chrominance buffer (102).

The embodiment of FIG. 3 differs from that of FIG. 2 in that the first and second B-frame luminance buffers and the B-frame chrominance buffer each include storage space for a number of additional video lines to provide rate flow buffering. Specifically, in the illustrated embodiment the first B-frame luminance buffer 98 is a circular buffer that holds one-half of the field one luminance pixel data for the B-frame and an additional forty lines of field one data as a rate flow buffer. The second B-frame luminance buffer 100 is a circular buffer that holds all of the field two luminance pixel data for the B-frame as well as thirty-two additional lines of rate flow buffering. The B-frame chrominance buffer holds one frame of chrominance (Cr and Cb) pixels and an additional thirty-two lines of rate flow buffering.

The rate flow buffering provides a cushion between the processing of the B-frames and the display thereof, to prevent a buffer overflow or underflow condition. The number of additional lines provided for rate flow buffering can be determined empirically. However, it is preferable for the first B-frame luminance buffer to be sized to store about 50% to 80%, and even more preferably between 50% to 66% of the amount of data contained in the first B-frame field. The second B-frame luminance buffer is preferably sized to store about 100% to 120% of the amount of luminance data in the second B-frame field. The B-frame chrominance buffer is preferably sized to store about 100% to 120% of the amount of chrominance data in the B-frame.

The eight Mbit B-frame memory map of FIG. 2 does not require such rate flow buffering. The reason is that the images decoded when using this memory map are only one-half the size of the maximum resolution that the video decompression processor is designed to decode. Therefore, decoding speed is not an issue and rate flow buffering is not required.

It should now be appreciated that the present invention provides a method and apparatus for mapping a random access memory in a digital video decompression processor. Instead of buffering complete PAL B-frames in the memory, only a portion of the first field of each B-frame is buffered. In an illustrated embodiment using eight megabits of DRAM, only one-half of the field one data for each B-frame needs to be buffered. In a sixteen megabit DRAM embodiment for full resolution PAL formatted video data, the buffer for the first field of B-frame luminance data is sized to store somewhere between 50 and 80%, and preferably about 66% of the amount of luminance data contained in the full field. A meaningful amount of memory is therefore saved.

Although the invention has been described in connection with various specific embodiments thereof, those skilled in the art will appreciate that numerous adaptations and modifications may be made thereto without departing from the spirit and scope of the invention as set forth in the claims.

What is claimed is:

1. A digital video decompression processor for a compressed video bitstream representative of successive video frames of pixel data, comprising:

means for extracting a decode time stamp from said video bitstream; and memory manager for mapping a random access memory to provide:

a FIFO buffer for said compressed video bitstream;

a first luminance anchor frame buffer and a first chrominance anchor frame buffer for storing a full frame of luminance data and a full frame of chrominance data for a first anchor frame used to predict B-frames and for subsequent output for use in reconstructing said successive video frames;

a second luminance anchor frame buffer and a second chrominance anchor frame buffer for storing a full frame of luminance data and a full frame of chrominance data for a second anchor frame used to predict said B-frames and for subsequent output for use in reconstructing said successive video frames;

a first B-frame luminance buffer sized to store less than 100% of the amount of luminance data in a first B-frame field for use in reconstructing said successive video frames;

a second B-frame luminance buffer sized to store at least 100% of the amount of luminance data in a second B-frame field for use in reconstructing said successive video frames; and a B-frame chrominance buffer sized to store at least 100% of the amount of chrominance data in a B-frame for use in reconstructing said successive video frames;

wherein:

storage locations of said first B-frame luminance buffer are available for reuse to provide storage space for remaining portions of said first field B-frame luminance data as the reconstruction of the B-frame continues; and said first and second anchor frames are decoded according to said decode time stamp.

2. A digital video decompression processor in accordance with claim 1 wherein said FIFO buffer comprises substantially all storage space left in said random access memory after accounting for said first and second luminance and chrominance anchor frame buffers, said first and second B-frame luminance buffers and said B-frame chrominance buffer.

3. A digital video decompression processor in accordance with claim 2 for decompressing an MPEG-2 video signal using B-frames in a PAL format and having video frames containing 576 video lines of 704 pixels each, wherein said first and second luminance anchor frame buffers each accommodate 576 video lines, said first and second chrominance anchor frame buffers each accommodate 288 video lines, said first B-frame luminance buffer accommodates 184 video lines, and said second B-frame luminance buffer and B-frame chrominance buffer each accommodate 320 video lines.

4. A digital video decompression processor in accordance with claim 3, wherein said memory manager provides a portion of said random access memory equivalent to about one video line for storing frame specific data required to properly display a decoded video frame.

5. A digital video decompression processor in accordance with claim 2 for decompressing an MPEG-2 video signal using B-frames in a PAL format and having video frames containing 576 video lines of 352 pixels each, wherein said first and second luminance anchor frame buffers each accommodate 576 video lines, said first and second chrominance anchor frame buffers each accommodate 288 video lines, said first B-frame luminance buffer accommodates 144 video lines, and said second B-frame luminance buffer and B-frame chrominance buffer each accommodate 288 video lines.

6. A digital video decompression processor in accordance claim 5, wherein said memory manager provides a portion of said random access memory equivalent to about one video line for storing data required to properly order a video frame for display.

7. A digital video decompression processor in accordance with claim 1 further comprising:

means for decoding said compressed video bitstream to reconstruct said B-frames from predictions based on said anchor frames;

wherein said memory manager:

writes portions of a B-frame being reconstructed into corresponding portions of said B-frame buffers, and commences reading first field luminance data for the B-frame being reconstructed from said first B-frame luminance buffer, for use in reconstructing a video frame for display, before the B-frame has been entirely reconstructed by said decoding means.

8. A digital video decompression processor in accordance with claim 1 wherein said first B-frame luminance buffer is sized to store only about 50% to 66% of an amount of luminance data contained in said first B-frame field.

9. A digital video decompression processor in accordance with claim 8 wherein:

said second B-frame luminance buffer is sized to store about 100% to 120% of an amount of luminance data contained in said second B-frame field; and said B-frame chrominance buffer is sized to store about 100% to 120% of an amount of chrominance data contained in said B-frame.

10. A digital video decompression processor in accordance with claim 1 wherein:

said second B-frame luminance buffer is sized to store about 100% to 120% of an amount of luminance data contained in said second B-frame field; and said B-frame chrominance buffer is sized to store about 100% to 120% of an amount of chrominance data contained in said B-frame.

11. A method for mapping a random access memory (RAM) of a digital video decompression processor to enable the reconstruction of successive video frames of pixel data represented by a compressed video bitstream, comprising the steps of:

extracting a decode time stamp from said video bitstream;

providing a FIFO buffer in said RAM for said compressed video bitstream;

providing a first luminance anchor frame buffer and a first chrominance anchor frame buffer in said RAM for storing a full frame of luminance data and a full frame of chrominance data for a first anchor frame used to predict B-frames;

providing a second luminance anchor frame buffer and a second chrominance anchor frame buffer in said RAM for storing a full frame of luminance data and a full frame of chrominance data for a second anchor frame used to predict said B-frames;

decoding said first and second anchor frames according to said decode time stamp;

providing a first B-frame luminance buffer in said RAM sized to store less than 100% of the amount of luminance data in a first B-frame field;

providing a second B-frame luminance buffer in said RAM sized to store at least 100% of the amount of luminance data in a second B-frame field; and providing a B-frame chrominance buffer in said RAM sized to store at least 100% of the amount of chrominance data in a B-frame;

wherein said anchor frames and B-frames are read from said RAM to enable the reconstruction of said successive video frames.

12. A method in accordance with claim 11 wherein said step of providing said FIFO buffer allocates to the FIFO buffer substantially all storage space left in said random access memory after accounting for said first and second luminance and chrominance anchor frame buffers, said first and second B-frame luminance buffers and said B-frame chrominance buffer.

13. A method for storing and retrieving B-frame data from the RAM mapped in accordance with the method of claim 11, comprising the steps of:

writing first and second field luminance and chrominance portions of a B-frame being reconstructed into corresponding portions of said B-frame buffers; and reading first field luminance data for the B-frame being reconstructed from said first B-frame luminance buffer before the B-frame has been entirely reconstructed;

wherein storage locations of said first B-frame luminance buffer are available for reuse to provide storage space for remaining portions of said first field B-frame luminance data as the reconstruction of the B-frame continues.

14. A method in accordance with claim 11 wherein said first B-frame luminance buffer is sized to store only about 50% to 66% of an amount of luminance data contained in said first B-frame field.

15. A method in accordance with claim 14 wherein:

said second B-frame luminance buffer is sized to store about 100% to 120% of an amount of luminance data contained in said second B-frame field; and said B-frame chrominance buffer is sized to store about 100% to 120% of an amount of chrominance data contained in said B-frame.

16. A method in accordance with claim 11 wherein:

said second B-frame luminance buffer is sized to store about 100% to 120% of an amount of luminance data contained in said second B-frame field; and said B-frame chrominance buffer is sized to store about 100% to 120% of an amount of chrominance data contained in said B-frame.

17. A digital video decompression processor for a compressed video bitstream representative of successive video frames of pixel data, said pixel data including chrominance and luminance data, said processor comprising:

a FIFO buffer for receiving successive frames of said chrominance and luminance data;

a decoder for decoding said successive frames of chrominance and luminance data to provide successive frames of decoded chrominance and luminance data, respectively, wherein respective ones of said successive frames of decoded chrominance and luminance data include anchor frames for use in reconstructing first and second fields of a B-frame of said video bitstream;

decoder synchronization means for providing said successive frames of said chrominance and luminance data from said FIFO buffer to said decoder according to timing data of said bitstream;

a first luminance anchor frame buffer and a first chrominance anchor frame buffer for storing, respectively, said decoded luminance and chrominance data of said first anchor frame;

a second luminance anchor frame buffer and a second chrominance anchor frame buffer for storing, respectively, said decoded luminance and chrominance data of said second anchor frame;

a first B-frame luminance buffer sized to store less than 100% of the amount of luminance data in said first field of said B-frame;

a second B-frame luminance buffer sized to store at least 100% of the amount of luminance data in said second field of said B-frame; and a B-frame chrominance buffer sized to store at least 100% of the amount of chrominance data in said B-frame;

wherein storage locations of said first B-frame luminance buffer are available for reuse to provide storage space for remaining portions of said first field B-frame luminance data as reconstruction of said B-frame progresses.

18. A digital video decompression processor in accordance with claim 17, wherein said timing data requires that said decoder synchronization means provide said successive frames of said chrominance and luminance data from said FIFO buffer to said decoder at substantially regular intervals.

19. A digital video decompression processor in accordance with claim 17, further comprising:

a memory manager for mapping a random access memory to provide said FIFO buffer, said first luminance and chrominance anchor frame buffers, said second luminance and chrominance anchor frame buffers, said first and second B-frame luminance buffers, and said B-frame chrominance buffer.

20. A digital video decompression processor in accordance with claim 17, wherein said timing data is determined according to a time stamp of said bitstream, said processor further comprising:

a video syntax parser for extracting said time stamp from said video bitstream.

* * * * *